United States Patent
Hunninghaus et al.

[11] Patent Number: 5,537,855
[45] Date of Patent: Jul. 23, 1996

[54] KNOCK DETECTION METHOD AND APPARATUS WITH DUAL INTEGRATION WINDOWS

[75] Inventors: Roy E. Hunninghaus, Des Plaines; Peter W. Murphy, Lake Zurich, both of Ill.; Kevin M. Andrews, Kenosha, Wis.

[73] Assignee: Motorola, Inc., Schaumburg, Ill.

[21] Appl. No.: 269,240

[22] Filed: Jun. 30, 1994

[51] Int. Cl.⁶ .................................................. G01L 23/22
[52] U.S. Cl. .................................................. 73/35.05
[58] Field of Search .................... 73/35, 35.03, 35.04, 73/35.05

[56] References Cited

U.S. PATENT DOCUMENTS

| | | | |
|---|---|---|---|
| 4,279,143 | 7/1981 | Guipaud | 73/35 |
| 4,345,558 | 8/1982 | Yamaguchi et al. | 73/35 |
| 4,346,586 | 8/1982 | Furrey | 73/35 |
| 4,455,862 | 6/1984 | Takeuchi | 73/35 |
| 4,478,068 | 10/1984 | Bonitz et al. | 73/35 |
| 4,640,250 | 2/1987 | Hosaka et al. | 73/35 |
| 4,667,637 | 5/1987 | Staerzl | 73/35 |
| 4,750,103 | 6/1988 | Abo et al. | 73/35 |
| 4,991,553 | 2/1991 | Kurihara et al. | 73/35 |
| 5,092,160 | 3/1992 | Ueda et al. | 73/35 |
| 5,408,863 | 4/1995 | Sawyers et al. | 73/35 |

*Primary Examiner*—John E. Chapman
*Attorney, Agent, or Firm*—Nicholas C. Hopman

[57] ABSTRACT

A knock detection method and apparatus integrates a knock sensor signal (107) over a first period and provides a first integrated knock sensor signal (119), and integrates the knock sensor signal (107) over a second period and provides a second integrated knock sensor signal (139). A knock indication (131) is provided dependent on an amplitude of the first integrated knock sensor signal (119) and an amplitude of the second integrated knock sensor signal (139) and independent of the influence of the variations of the knock sensor (101) potential sensor to sensor gain variation.

1 Claim, 2 Drawing Sheets

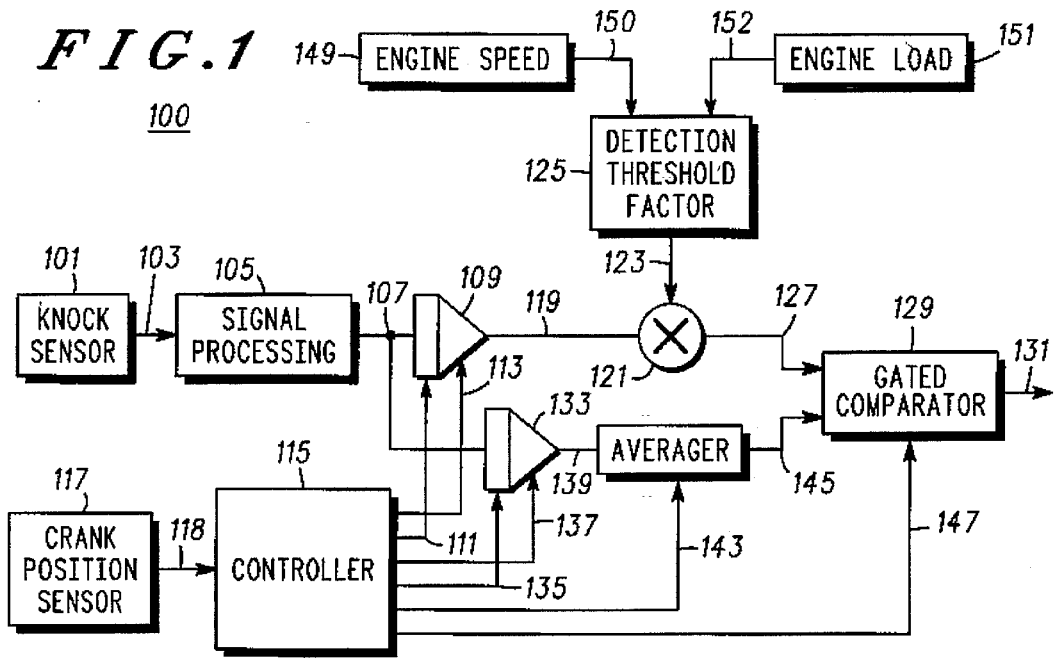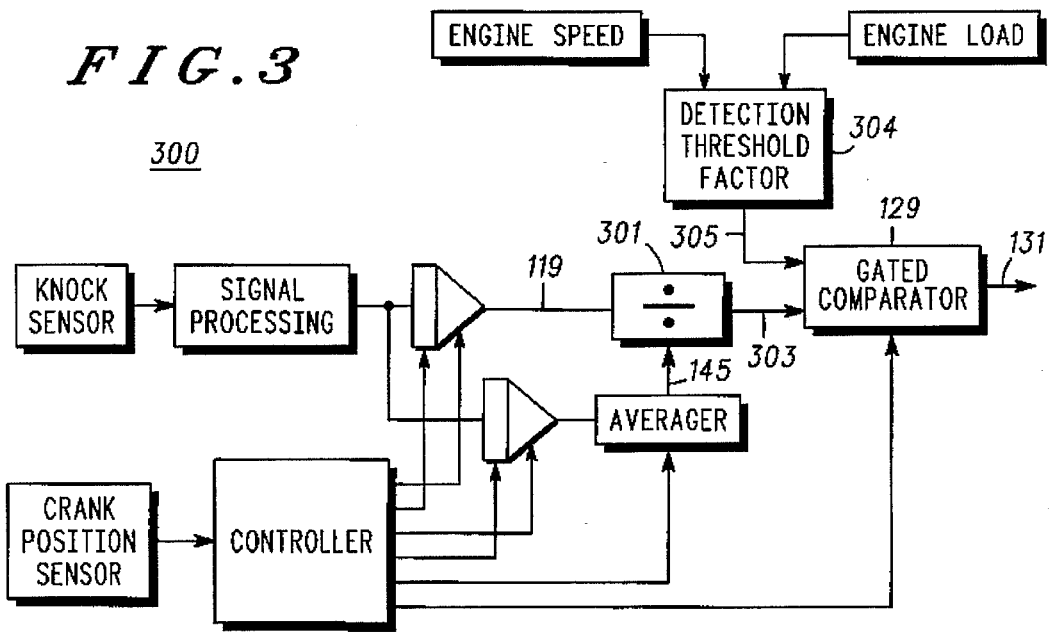

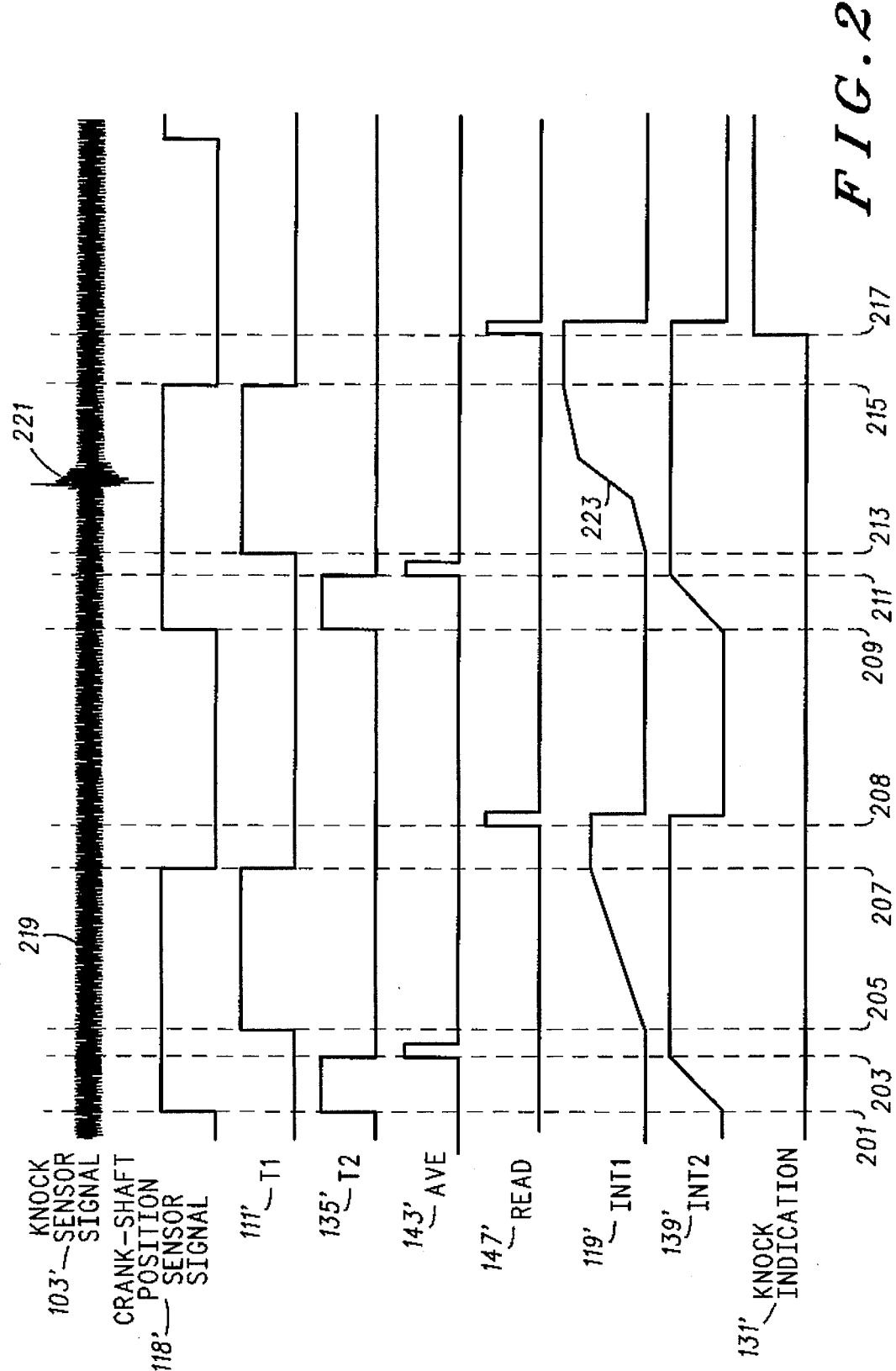

KNOCK DETECTION METHOD AND APPARATUS WITH DUAL INTEGRATION WINDOWS

FIELD OF THE INVENTION

This invention is generally directed to the field of knock detection, and specifically for knock detection in a reciprocating engine.

BACKGROUND OF THE INVENTION

Contemporary reciprocating engine systems include apparatus for detecting a knocking condition. Typically, a knocking condition occurs when an ignition event is too far advanced for an air fuel mixture charge in a cylinder in relation to the octane rating of the fuel.

Often, a knock detection system provides a signal to an ignition advance section of an engine control to indicate that a knock condition exists and directs that the ignition advance should be reduced or retarded. When there is a no-knock condition indicated, the ignition advance is slowly re-advanced until the knock limit is again exceeded and a knock re-occurs in one or several of the engine cylinders. It should be noted that in mounting a typical crankshaft position sensor to the engine, for use by the engine control's main ignition advance control section, there could be a slight error between the indicated engine crankshaft position and the actual engine crankshaft position. Thus, with the error in the crankshaft position sensor indication and the variation in octane rating of the fuel purchased and used in the engine, the engine control does, to know what the exact critical ignition advance knock limit is, in all cases and conditions. Knock detection systems can be used to compensate for this condition.

The purpose of a knock detection system is to identify when the engine enters into a knock condition so that the ignition advance section of the engine control can adaptively determine and update the ignition advance so as not to exceed the knock limit. Since the engine control is continuously re-determining the variations in the ignition advance knock limit from-information provided by the knock detection system, it is undesirable to have the detection system's operation dependent of a need to know how far the current ignition advance is from the knock limit. It should be noted that there are many possible levels of knock and that knock can occur prior to the critical ignition advance knock limit. In essence the probability of a knock occurrence and the probability of a magnitude of the knock is a function of spark advance. Also, in the calibration of a knock detection system, the calibration is deliberately set to allow some low level of knock to occur without indicating a knock condition to the ignition advance control.

The above description is important to consider since normal engine combustion noise, which shares a same frequency spectrum as a knocking condition, also increases as a function of increasing ignition advance. This occurs in the same ignition advance region as the critical ignition advance knock limit. It is therefore necessary in the design of a knock detection system to properly factor in the presence of combustion noise and not allow it to be adversely considered as an indication of a larger magnitude knock condition than is actually occurring in the engine.

Typical production acoustic or accelerometer knock sensors exhibit a wide production gain variation from sensor to sensor. In many cases the production sensor to sensor gain difference can exceed the difference between the magnitude of the mechanical noise read by a specific sensor and the magnitude of the knock occurrence read by the same sensor.

In order to properly and reliably use this type of production knock sensor, the detection system must first make a determination of the gain of the specific sensor or sensors being used on a specific engine. This is typically done by taking a reading of a known or predictable mechanical noise for that engine. In this case the variation in the sensor reading from the expected reading can be used as an indication of the sensor gain. It is desirable to establish this sensor gain indication so that the knock sensor only being be stimulated by the known or predictable mechanical engine noise and not be stimulated by a knock occurrence or combustion noise, both of which can vary in magnitude by the operation of the ignition advance control in response to the knock/no-knock indication provided by the knock detection system.

Once such a reliable mechanical engine noise times sensor gain reading is established, this value can be used in comparison to a sensor reading of mechanical engine noise plus combustion noise plus knock magnitude times sensor gain in such a manner that the sensor to sensor gain variation does not influence the knock/no-knock decision and indication from the knock detection system to the ignition advance control. However, should the sensor gain determination reading be an indication of the mechanical engine noise plus combustion noise plus a potential amount of low level knock times the sensor gain, then the variation from the expected sensor reading will not be a true indication of the pure sensor to sensor gain variation and the reliability of the use of this reading value as a sensor gain indication will be in question and can adversely effect a correct knock/no-knock decision and indication by the knock detection system.

Prior art knock detection schemes are inadequate because using a single integration window and a long term average approach combustion noise and low magnitude knock occurrence contribute to the sensor gain indication reading. Thus the long term average of the integration window reading when a no-knock decision is indicated, can vary as a function of ignition advance related combustion noise and knock occurrence and magnitude. The variation in this longer term average is not solely a function of sensor to sensor gain variation as is desired. Thus considering this long term average as an indication of sensor gain only, erroneous knock/no-knock decisions can result in the comparison method where it was assumed that the sensor gain variation was eliminated from the decision process.

What is needed is an improved knock detection system for a reciprocating engine that more reliably and accurately detects engine knocking over the full range of engine operating conditions. Such an improved knock detection system must improve the manner in which the sensor to sensor gain variation is determined.

BRIEF DESCRIPTION OF THE DRAWINGS

FIG. 1 is a system block diagram of a knock detection apparatus with dual integration windows, in accordance with a preferred embodiment of the invention;

FIG. 2 is a diagram showing signals found in FIG. 1; and

FIG. 3 is a system block diagram illustrating an alternative embodiment to that shown in FIG. 1.

DETAILED DESCRIPTION OF A PREFERRED EMBODIMENT

A knock detection method and apparatus integrates a knock sensor signal and provides a first integrated knock sensor signal, and integrates the knock sensor signal over a second period and provides a second integrated knock sensor signal. A knock indication is provided dependent on an amplitude of the first integrated knock sensor signal and an amplitude of the second integrated knock sensor signal.

Preferably, a duration and rate of integration associated with the provision of the second integrated knock sensor signal corresponds to a duration and rate of integration associated with the provision of the first integrated knock sensor signal by a fixed relationship. Details of the invention will be more clearly appreciated in view of the FIGS. and the following description.

FIG. 1 is a system block diagram of a knock detection apparatus with dual scaled-period-rate integration windows. A knock sensor 101, having an unknown knock sensor gain Gs, provides a knock sensor signal 103 to linear signal processor 105. This linear signal processing function is typically comprised of a passive bandpass filter/sensor loading circuit, a high impedance input buffer stage, which may have either a fixed or selectable gain factor, an active bandpass filter, with a pass region typically set for frequencies between 5 KHz and 17 KHz and a rectifier, preferably a full wave rectifier. The signal processing function 105 processes this knock sensor signal 103 and provides a processed knock sensor signal 107. The processed knock sensor signal 107 is provided to both a first integrator 109 and a second integrator 133. The function of the first integrator 109 is to integrate the processed knock sensor signal 107 during an angular window or period at a point in an engine combustion cycle where a knock event is expected to occur. The function of the second integrator 133 is to integrate the processed knock sensor signal 107 during an angular window or period at a point in the engine combustion cycle where a knock event is not expected to occur. The knock sensor signal 103 and the processed knock sensor signal 107 are indicative of a known or predictable mechanical engine noise.

A crankshaft position sensor or equivalent mechanism 117 produces a crankshaft position signal 118 once every cylinder ignition of the engine to produce a reference indication of when the engine crankshaft is at a known angular position. Typically for a once per cylinder ignition crankshaft position sensor or mechanism, a logical "0" to "1" transition is generated when any of the engine cylinders reaches a point that is 10 degrees before top dead center, some times referred to as the default ignition angle. Any such crankshaft position sensor or mechanism which produces a signal reference, or from which a reference signal can be derived at a known engine angle, in the approximate position of the desired engine default ignition angle is sufficient for use in this knock detection system. This crankshaft position signal 118 is provided to a controller 115.

The controller 115, which could be implemented in one of many possible manners, uses the crankshaft position signal 118 to produce a first angular window or period signal 111, of a duration T1, and a second angular window or period signal 135, of a duration T2. As mentioned above, the controller 115 uses preset or programmable information in order to produce the first angular window over an angular duration of the engine cycle where a knock event is expected to occur. Typically this is in a region of from 10 degrees after top dead center to 45 degrees after top dead center of each of the engine's cylinders. Typically, the start angle and angular duration are provided in or specified to the controller 115 in any of several manners. The controller 115 uses preset or programmable information in order to produce the second angular window signal 135, where the duration of the second angular window is held in a scaled or ratioed relationship to the first angular window and starts at a convenient engine angle such that the second angular window occurs over an angular duration of the engine cycle where a knock event is not expected to occur. Preferably, the two angular windows or periods would not overlap, but some amount of overlap is allowable as long as the expected knock event is contained within the duration of the first angular window and the expected knock event or a portion of the expected knock event and/or normal cylinder combustion noise, which can be a function of the current engine ignition advance angle, does not occur in any significance during the duration of the second angular window. The second angular window can be chosen to start at either a preset or programmable engine angle, or at a convenient already known or indicated engine angle as long as the above criteria is met.

The controller 115, produces a first integration rate signal 113 and a second integration rate signal 137. The controller 115 uses preset or programmable information in order to produce the first integration rate signal R1 113, and the second integration rate signal R2 137, such that the product of the first integration rate R1, times the duration of the first angular window T1, is held in a known relationship Krt, to the second integration rate R2, times the duration of the second angular window T2. This can be shown in equation form as:

EQUATION 1

$$R1 \cdot T1 = Krt \cdot R2 \cdot T2$$

Typically the known relationship Krt, will have a value of one, but it is not necessary for Krt to equal one, as long as the product of the related rates and duration's are controlled fin a known relationship. An alternate form of the equation, when Krt is allowed to equal one, would be:

EQUATION 2

$$R2/R1 = T1/T2$$

The first angular window T1, would typically have an angular duration of 35 to 45 degrees, starting at approximately 10 degrees after top dead center for the cylinder under consideration. Both windows T1 and T2 are controlled in response to the crankshaft position sensor signal 118. A typical value for the ratio of T1/T2 would be four (4). For a case where it is desired to maintain the known relationship Krt, at unity (1), the second integration rate R2, would be four (4) times faster than the first integration rate R1.

As noted above, the known relationship Krt need not be unity (1) and can be varied in order to facilitate a particular form of implementation. For example, the preceding processing stages could convert from analog form to digital form, using an analog to digital converter. It may be desirable to optimize the performance of the analog converters reading resolution by changing the known relationship Krt to a value of one half (½), in which case the second integration rate R2 would be made eight (8) times faster than the first integration rate R1. Using a known relationship Krt of other than unity (1) is possible in this system, as long as the appropriate correction for Krt not being equal to one is made in the succeeding section of the processing system.

The first angular window signal 111 and the first integration rate signal 113 are provided to the first integrator 109. The first angular window signal 111 and first integration rate signal 113 specify to the integrator 109 when and at what rate the processed knock sensor signal 107 should be integrated. The first integrator 109 produces a first integrated processed knock sensor signal 119, in response to the processed knock sensor signal 107, the first angular window signal 111 and the first integration rate signal 113. The first integrated processed knock sensor signal 119, indicative of the expected occurrence of knock, is scaled by the knock sensor 101's sensor gain Gs.

The second angular window signal 135 and the second integration rate signal 137 are provided to the second integrator 133. The second angular window signal 135 and second integration rate signal 137 specify to the integrator 133 when and at what rate the processed knock sensor signal 107 should be integrated. The second integrator 133 produces a second integrated processed knock sensor signal 139, in response to the processed knock sensor signal 107, the second angular window signal 135 and the second integration rate signal 137. The second integrated processed knock sensor signal 139, indicative of a known occurrence of no-knock, is also scaled by the knock sensor 101's sensor gain Gs.

The first integrator 109, produces an integrated processed knock sensor signal 119, which contains information relating to the engine mechanical noise MN1, the normal combustion noise CN1, and the magnitude of potential knock occurrence KO1, all scaled by the knock sensor 101's gain Gs, integrated at a rate R1, over the angular window T1, where a knock occurrence is expected to occur.

The second integrator 133, produces an integrated processed knock sensor signal 139, which contains information relating to the engine mechanical noise MN2, scaled by the knock sensor 101's gain Gs, integrated at a rate R2, over the angular window T2, where no significant normal combustion noise CN2=0, and/or magnitude of knock occurrence KO2=0, will be present to any meaningful extent.

The mechanical noise during the duration of the angular window T1 where knock is expected to occur MN1, and the mechanical noise during the duration of the angular window T2 where it is expected that no-knock will occur MN2, are both primarily known or predictable values for a given engine type at specific engine operating conditions, such as speed and load.

The knock sensor 101 having a scaling sensor gain Gs, produces a knock sensor signal 103, in response to the engine operating condition mechanical noise which is indicative of the mechanical noise times the sensor gain. Thus the integrated processed knock sensor signals, 119 and 139 are both scaled by the knock sensors 101's gain Gs; in equation form:

EQUATION 3

Signal $119 = G_s \cdot INT(PRO(MN1), R1, T1)$

EQUATION 4

Signal $139 = G_s \cdot INT(PRO(MN2), R2, T2)$

When only mechanical noise is present.

Since the mechanical noise for a given engine operating condition is known or predictable, any variation in the integrated processed knock sensor signals 119 or 139, when only mechanical noise is known to be present, can be taken as an indication of the knock sensor 101's gain Gs. Since during the angular window T1 combustion noise and/or knock occurrence can be present in addition to known or predictable mechanical noise, the variations from the expected value of the integrated processed knock sensor signal 119 can not be taken as a true indication of the knock sensor 101's gain Gs. Since during the angular window T2 combustion noise and/or knock occurrence can be expected to not be present in addition to known or predictable mechanical noise, the variations from the expected value of the integrated processed knock sensor signal 139 can be taken as a true indication of the knock sensor 101's gain Gs.

The controller 115 produces a second integration complete signal 143. This integration complete signal 143 is generated after the completion of the second angular window signal 135 and indicates that the second integrated processed knock sensor signal 139 is a valid integrated processed knock sensor signal value which can be used by succeeding portions of the system.

The integrated processed knock sensor signal 139 is provided to an averager 141. The second integration complete signal 143 is provided to the average 141. The average 145 produces an averaged second integrated processed knock sensor signal 145, where the average is updated in response to the second integration complete signal 143. Since the second integrated processed knock sensor signal 139 is scaled by the knock sensor 101's gain Gs, the averaged second integrated processed knock sensor signal 145 is also scaled by the knock sensors 101's gain Gs; in equation form:

EQUATION 5

Signal $145 = G_s \cdot AVE(INT(PRO(MN2), R2, T2))$

When only mechanical noise is present.

The average mechanical engine noise can be considered to be known or predictable for a given engine operating condition. However, it might be possible that the mechanical engine noise for a specific engine condition might possibly vary on a cyclic or cylinder to cylinder basis. It may thus be desirable, but not strictly necessary, to average the second integrated processed knock sensor signal 139 over a number engine cylinder ignition periods, if it is necessary to account for potential cyclic or cylinder to cylinder instantaneous variation in the engine mechanical noise, in order to distinguish such instantaneous variations from long term variations in the expected values of the second integrated processed knock sensor signal 139, in the determination of the knock sensor 101's gain Gs.

One of several forms of known text book mathematical event weighted or un-weighted (equally weighted) averaging algorithms would be adequate for the desired cancellation of the effect of instantaneous, verses long term, variation in the engine mechanical noise level. One such weighted averaging routine would be a discrete-piece-wise linear implementation of a first order lowpass filter, derivable from simple calculus, expressed in equation form as:

EQUATION 6

$AVEnew = K_{ac} \cdot (VALnew - AVEold) + AVEold$

Where the weighting factor Kac, which is inversely proportional to a first order lowpass filter time constant, places a decreasing weighting factor on increasingly older values, as can be seen if a series expansion of the above equation were performed. One such un-weighted (equally weighted) averaging routines would be to perform a simple average of a desired number of the last values.

In the use of the above weighted averaging routine, it may be desirable, but not specifically necessary, to use different values for the weighting factor Kac, when the new value is greater than or less than the average value. It may be desirable, but not specifically necessary, to set the weighing factor Kac, to zero, do not use this value, when it is determined that a knock has occurred. This is a difference therefor the averaging operation in a single integration window detection system. Since in the single window system, where knock or combustion noise would be present in the integrated value, it is specifically necessary to not use, or significantly reduce the weighting of the single window integrated value in the average when a knock condition is indicated, in order to determine a knock sensors gain for the variations in expected mechanical noise.

There is an engine speed determining means 149, producing an engine speed signal 150, and an engine load determining means 151, producing an engine load signal 152, the combination of which can be used as an indication of the engine operating condition. Engine speed and engine load are the two primary engine parameters used in the determination of the engine operating condition. Other engine parameters, such as engine coolant temperature, might also sometimes be used as secondary importance indications of engine operating condition. The engine load determinator receives signal, either directly or indirectly, from various potential devices in order to determine engine load. Engine load is commonly determined from throttle position, manifold absolute pressure or vacuum or mass air flow into the air intake manifold of the engine.

The engine speed signal 150 and the engine load signal 152 are provided to a detection threshold determinator 125. The detection threshold determinator produces a detection threshold factor signal 123, as a function of engine operating condition as determined from the engine speed signal 150 and engine load signal 152. A combination of the engine speed signal 150 and the engine load signal 152 determines which specific threshold factor is to be used and output as the threshold detection factor signal 123.

The threshold detection factor signal 123 are derived from a prior knowledge of what the mechanical engine noise will be during the first and second angular window T1 and T2, and the allowed level of combustion noise plus magnitude of knock occurrence, during the first angular window T1, for specific engine operating conditions. The mechanical noise level during the first and second angular window periods, T1 and T2, may be different in a known or predictable manner. Such a variation in the levels expected mechanical engine noise during the two angular windows or periods, T1 and T2, can be accounted for in the specific detection threshold factors of specific engine conditions.

Primarily, the same detection threshold factor is to be applied to the knock detection operation for all engine cylinders. Should information be provided to the detection threshold factor determinator 125 indicating which cylinder is currently being examined for determination of a potential knock occurrence, the detection threshold factor signal 123 can be updated on a cylinder specific basis.

The detection threshold factor signal 123, has a detection threshold factor value Sdf and is a scalar having a value of one or less than one in the implementation depicted in FIG. 1. The significance of the detection threshold factor value is that a value of Sdf=0.5 implies that the mechanical noise reading is basically equivalent to the sum of the allowed combustion noise, CN1al, plus the magnitude of the allowed knock occurrence KO1al, when the mechanical noise levels are equal, MN1=MN2, in the two angular windows or periods, T1 and T2.

The first integrated processed knock sensor signal 119 and the detection threshold factor signal 123 are input into a multiplier 121. The multiplier 121 produces a detection level first integrated processed knock sensor signal 127. The value of the first integrated processed knock sensor signal 119 can be expressed in equation form as:

EQUATION 7

Signal $119 = G_s \cdot INT(PRO(MN1+CN1+KO1), R1, T1)$

The product of detection threshold factor signal 123 scaling value, Sdf, multiplied by the first integrated processed knock sensor signal 119, being the value of the detection level first integrated processed knock sensor signal 127 can be expressed in equation form as:

EQUATION 8

Signal $127 = Sdf \cdot G_s \cdot INT(PRO(MN1+CN1+KO1), R1, T1)$

The controller 115 produces a knock determination decision signal 147. This knock determination decision signal 147 is generated after the completion of the first and second integration angular windows or periods, T1 and T2, when the first and second integrated processed knock sensor signals 119 and 139 are valid; when the averaging in the averager 141 has been completed and the averaged second integrated processed knock sensor signal 145 is updated and valid; and when the multiplication by the multiplier 121 has been completed and the detection level first integrated processed knock sensor signal 127 is valid.

The detection level first integrated processed knock sensor signal 127, the averaged second integrated processed knock sensor signal 145 and the knock determination decision signal 147 are input into a gated comparator 129. The gated comparator 129 produces a knock/no-knock indication signal 131, from the result of the comparison of the detection level first integrated processed knock sensor signal 127 and the averaged second integrated knock sensor signal 145 when the knock determination decision signal 147 is present. The knock/no-knock indication signal 131 may either indicate the results of the last comparison at the time of the receipt of the last knock determination decision signal 147 or may be valid only while the knock determination decision signal 147 is present.

The gated comparator 129 basically performs its comparison by a mathematical subtraction of the averaged Second integrated processed knock sensor signal 145 from the detection level first integrated processed knock sensor signal 127. This comparison by mathematical subtraction can be expressed in equation form as:

EQUATION 9

Signal 127–Signal $145 = Sdf \cdot G_s \cdot INT(PRO(MN1+CN1+KO1), R1, T1) - G_s \cdot AVE(INT(PRO(MN2), R2, T2))$ which can be reduced to

EQUATION 10

Signal 127–Signal $145 = G_s \cdot ((Sdf \cdot INT(PRO(MN1+CN1+KO1)R1, T1) - AVE(INT(PRO(MN2), R2, T2)))$ And where the ratio of the integration rates, R2/R1, is maintained in a constant and equal relationship to the ratio of the angular windows T1/T2, the equation can be reduced to:

EQUATION 11

Signal 127−Signal 145=$GS \cdot ((Sdf \cdot INT(PRO(MN1+CN1+KO1)))-AVE(INT(PRO(MN2))))$ If the sign of this subtraction is positive, the detection level first integrated processed knock sensor signal 127 is greater than the averaged second integrated processed knock sensor signal 145, a knock occurrence indication decision is made. If the sign of this subtraction is negative, the detection level first integrated processed knock sensor signal 127 is less than the averaged second integrated processed knock sensor signal 145, a no-knock occurrence indication decision is made.

In the above equation the knock sensor 101's gain Gs, acts as a scaler on the result of the subtraction and does not influence the resultant sign of the mathematical subtraction. Thus, the knock sensor 101's gain Gs, does not factor into the knock/no-knock decision process.

At some convenient point after the receipt of the knock determination decision signal 147, the gated comparator 129 has completed its comparison and produced the correct knock/no-knock indication signal 131, the first and second integrators 109 and 133 can be reset or re-initialized in readiness for the next operation cycle.

As previously indicated the controller 115, which produces the first and second angular window signals 111 and 135, can start the second angular window T2 at any convenient point in that no engine cycle, as long as during the second angular window T2 the significant magnitude of combustion noise or magnitude of knock occurrence can be expected to be indicated in the knock sensor signal 103. A first such convenient angular point in the engine cycle was indicated to be the default ignition angle as indicated by the crankshaft position signal 118. A second such convenient angular point in the engine cycle could be the end of the first angular window as indicated by the first angular window signal 111.

The controller 115 is intended to maintain the duration of the second angular window signal 135 at a known relationship to, or ratio of, the duration of first angular window signal 111. Dependent on the detailed implementation technology, this may be accomplished in several manners. In one case, the first and second angular window signals 111 an 135 can be generated or predicted directly from a knowledge or prediction of the current engine crankshaft angle. In another case, the time of the duration of the first angular window signal 111 can be measured and scaled and the second angular window signal 135 can be generated as a time duration signal. In the case of discrete sampled systems, such as switched capacitor analog or high rate digital sampling and DSP digital processing, the number of samples taken during the duration of the first angular window signal 111 can be counted and scaled and the second angular window signal 135 can be generated as a count of the desired number of samples.

As currently shown in FIG. 1, the system is implemented using two independent integrators 109 and 133 or means of integration. The importance to the system is that two separate integrations be performed. Alternate implementations could be used having only one integrator but still providing a first integrated processed knock sensor signal 119 and a second integrated processed knock sensor signal 139 and/or an averaged integrated processed knock sensor signal 145 because the signals 119 and 139 are derived time independent of each other. It is possible, in the case of non-overlapping integration periods to implement the system; with one integrator and a sample and hold function; with one integrator and the averager 141 operating as a sample and hold function in addition to operating as an averager; with one analog integrator and an analog to digital converter where the first and second integrated processed knock sensor signals 119 and 139 are values stored in digital RAM memory; and other combinations are possible.

FIG. 2 is a diagram showing signals found in FIG. 1. A description of the signals and their related typical key significance waveforms will offer a better understanding of the embodiment shown in FIG. 1.

The knock sensor signal 103 of FIG. 1 is represented in FIG. 2 by a knock sensor signal waveform 103'. For the purpose of explanation, the knock sensor signal waveform 103' depicts the response of a knock sensor 101 to a consistent level of mechanical noise, with the exception of the region indicated by reference number 221. A region indicated by reference number 221 depicts a typical "knock burst" in the knock sensor signal 103 as the knock sensor 101 response to the occurrence of a knock event.

For the purpose of explanation, if it is assumed that all the knock sensor signal 103 information is within the pass-band range of the passive and active bandpass filters in the signal processing function 105, then the processed knock sensor signal 107 waveform will look similar to the knock sensor signal waveform 103', with the exception that only positive going information will be present due to the action of the rectifier in the signal processing function 105.

The crankshaft position signal 118 of FIG. 1 is represented in FIG. 2 by a crankshaft position signal waveform 118'. It should be noted that the logical "0" to "1" transition, or rising edge, represents the default ignition angle which is typically 10 degrees before top dead center. The logical "1" to "0" transition, or falling edge, has no significance in this description of the system.

The first angular window signal 111 and the second angular window signal 135 of FIG. 1 are represented in FIG. 2 by a first angular window signal waveform 111' and a second angular window signal waveform 135'. It can be noted that FIG. 2 depicts that the knock burst in the region indicated by reference number 221, in the knock sensor signal waveform 103', is contained within the first angular window T1, as indicated by the first angular window signal waveform 111' being at a logical "1". And that the knock burst in the region indicated by reference number 221, in the knock sensor signal waveform 103', is not contained within the second angular window T2, as indicated by the second angular window signal waveform 135' being at a logical "1".

FIG. 2 is meant to depict a case were the relationship between the duration of the first angular window T1, and the second angular window T2, is maintained at a ratio, T1/T2, of four (4). As stated in the explanation of FIG. 1, the beginning of the second angular window T2, can be chosen to start at a conveniently known engine angle position, such as the default ignition angle, as indicated in FIG. 2 by the coincidence of the rising edge of the second angular window signal waveform 135' with the rising edge of the crankshaft position sensor signal waveform 118'. Also, FIG. 2 depicts a case where the duration of the first and second angular windows or periods, T1 and T2, are non-overlapping.

The second integration complete signal 143 of FIG. 1 is represented in FIG. 2 by a second integration complete signal waveform 143'. It can be noted that the second integration complete signal 143, or average (AVE) command, occurs after the end of the duration of the second angular window T2, indicating the completion of the second integration operation and that the averager 141 can now include the current value of the second integrated processed knock sensor signal 139 in the average.

The knock determination decision signal 147 of FIG. 1 is represented in FIG. 2 by knock determination decision signal waveform 147'. It can be noted that the knock determination decision signal 147, or read (READ) command, occurs after the end of the duration of the first and second angular windows or periods T1 and T2, and the average (AVE) command indicating that the gated comparator 129 can now make a decision using the current value of the first integrated processed knock sensor signal 119 and/or the detection level first integrated processed knock sensor signal 127 and the current value of the second integrated processed knock sensor signal 139 and/or the averaged second integrated processed knock sensor signal 145. After the receipt of this read (READ) command, and prior to the beginning of the next cycle, the first integrator 109 and the second integrator 139 can be reset or reinitialized.

The first and second integrated processed knock sensor signals 119 and 139 of FIG. 1 are represented in FIG. 2 by the first and second integrated processed knock sensor signal waveforms 119' and 139' (INT1 and INT2). It can be noted in FIG. 2 that the first and second integrated sensor signal waveforms 119' and 139' only increase in value during the duration of the first and second angular windows or periods, T1 and T2, respectively. And that in response to FIG. 2's explanation example of an assumed constant mechanical noise (MN1=MN2) that the second integrator 139's value increases four (4) times faster than the first integrator 109's value increases. And that the final value of the first and second integrators 109 and 133, and thus the values of the first and second integrated processed knock sensor signals 119' and 139' are equal. This is meant to depict the case where the relationship between the duration of the first and second angular windows or periods, T1 and T2, and the first and second integration rates, R1 and R2, are held to be equal (R1·T1=R2·T2 and T1/T2=R2/R1=4).

During the second shown occurrence of the duration of the first angular window T1, the time from reference number 213 to reference number 215, a knock burst, reference number 221, occurs. In response to the knock burst, reference number 221, indicated in the knock sensor signal waveform 103', the rate of increase in the first integrator 109's value and the rate of increase in the first integrated processed knock sensor signal 119' value increase, as represented in the region indicated by reference number 223 in the first integrated processed knock sensor signal waveform 119'. Thus the final value of the first integrator 109 and the first integrated processed knock sensor signal 119 will be significantly greater at the end of the second shown occurrence of the first integration period, T1, the time of which is indicated by reference number 215, than at the end of the first shown occurrence of the first integration period, T1, the time of which is indicated by reference number 207. This is meant to depict the difference in response of the first integrator 109 and the first integrated processed knock sensor signal 119 to a knock and no-knock occurrence.

In the case where the mechanical engine noise can be considered constant, the value of the averaged second integrated processed knock sensor signal 145 and the value of the second integrated processed knock sensor signal 139, after the completion of the second integration operation and until the resetting of the first and second integrators 109 and 139, will be equal. Thus for the purpose of explanation, the value of averaged second integrated processed knock sensor signal 145 can be represented as the value indicated in the second integrated processed knock sensor signal waveform 139', when the decision determination signal 147 indicates a rear (READ) command.

The knock/no-knock indication signal 131 of FIG. 1 is represented in FIG. 2 by the knock/no-knock indication signal waveform 131'.

In the description of the embodiment of the system shown in FIG. 1, it was stated that the first integrated processed knock sensor signal 119 and detection threshold factor signal 123, having a value, Sdf, less than one, are multiplied in the multiplier 121, which produces the detection level first integrated processed knock sensor signal 127. Thus in FIG. 2, when the first integrated processed knock sensor signal waveform 119's value is shown to be greater than the second integrated processed knock sensor signals wave form 139's value, by a factor equivalent to the inverse of the value of the detection threshold factor signal 123 (if Sdf=0.5, then greater than by a factor of two), at the time the decision determination signal 147 indicates a read (READ) command, a knock indication is to be indicated by the knock/no-knock indication signal 131. In FIG. 2, The first and second integrated processed knock sensor signal waveforms 119' and 139' depict a no-knock occurrence at time reference number 208 with a no-knock indication shown by the knock/no-knock indication signal waveform 131' and a knock occurrence at time reference number 217 with a knock indication shown by the knock/no-knock indication signal waveform 131'.

FIG. 3 is a system block diagram of a knock detection apparatus with dual scaled-period-rate integration windows shown in an alternate embodiment from that shown in FIG. 1. The embodiment shown in FIG. 3 is identical to the embodiment shown in FIG. 1 with the following exceptions. The multiplier 121 in FIG. 1 has been deleted from FIG. 3. A divider 301 has been added to FIG. 3. The nature of the detection threshold factor signal 305, produced by the detection threshold factor determinator 301, varies slightly from the nature of the detection factor signal 123, produced by the detection threshold factor determinator 125. The input signals to the gated comparator 129 have changed from FIG. 1 to FIG. 3. However, the embodiment shown in FIG. 3 functions essentially the same, with only a change in the final knock/no-knock decision process, as the embodiment shown in FIG. 1, producing the same resultant knock/no-knock decisions. The engine speed signal 150 and the engine load signal 152 are fed into a detection threshold factor determinator 304. The detection threshold factor determinator 304 produces a detection threshold factor signal 305, as a function of engine operating condition as determined from the engine speed signal 150 and engine load signal 152. Preset of specifiable detection threshold information is used in the detection threshold factor determinator 304 and the combination of the engine speed signal 150 and the engine load signal 152 determines which specific threshold factor is to be use and output as the threshold detection factor signal 305.The preset of specifiable detection factors provided to or in the detection threshold factor determinator 304 are derived from a prior knowledge of what the mechanical engine noise will be during the first and second angular window or period, T1 and T2, and the allowed level of combustion noise plus magnitude of knock occurrence, during the first angular window or period, T1, for specific engine operating conditions. The mechanical noise level during the first and second angular window periods, T1 and T2, may be different in a known or predictable manner. Such a variation in the levels expected mechanical engine noise during the two angular windows or periods, T1 and T2, can be accounted for in the specific detection threshold factors of specific engine conditions. Primarily, the same detection threshold factor is to be applied to the knock detection operation for all engine cylinders. Should information be provided to the detection threshold factor determinator 304 indicating which cylinder is currently being examined for determination of a potential knock occurrence, the detection threshold factor signal 305 can be updated on a cylinder specific basis. The detection threshold factor signal 305, having a detection threshold factor value, Sdf, is a scalar having a value of one or more than one in the implementation depicted in FIG. 3. The significance of the detection threshold factor value is that a value of Sdf=2.0 implies that the mechanical noise reading is basically equivalent to the sum of the allowed combustion noise, CN2al, plus the magnitude of the allowed knock occurrence KO2al, when the mechanical noise levels are equal, MN1=MN2, in the two angular windows or periods, T1 and T2. The first integrated processed knock sensor signal 119 and averaged second integrated processed knock sensor signal 145 are input into a divider 301. The divider 301 produces a ratioed first integration to second integration signal 303, which is the result of the first integrated processed knock sensor signal 119 divided by the averaged second integrated knock sensor signal 145. Where the value of the first integrated processed knock sensor signal 119 can be expressed in equation form as:

EQUATION 12

Signal $119 = Gs \cdot INT(PRO(MN1+CN1+KO1), R1, T1)$

And where the value of the averaged second integrated processed knock sensor signal 145 can be expressed in equation form as:

EQUATION 13

Signal $145 = Gs \cdot AVE(INT(PRO(MN2), R2, T2))$

When only mechanical noise is present. The ratioed first integration to second integration signal 303, which is the result of the divide operation, can be expressed in equation form as:

EQUATION 14

Signal $303 = (Gs \cdot INT(PRO(MN1+CN1+KO1), R1, T1) / (Gs \cdot AVE(INT(PRO(MN2), R2, T2)))$ The above equation can be further reduced to:

EQUATION 15

Signal $303 = (INT(PRO(MN1+CN1+KO1), R1, T1) / (AVE(INT(PRO(MN2), R2, T2)))$

As can be seen from the above equation, the knock sensor 101's gain Gs, has been canceled for the reduced equation and thus the knock sensor 101's, can be eliminated from the knock/no-knock decision process. It should be noted that the magnitude of the ratioed first integration to second integration signal 303 has significance as compared to a cancellation of the effects of the knock sensor 101's in a comparison by mathematical subtraction. Should a means be provide in the detection system for this ratioed first integration to second integration signal 303 to be output at a cylinder to cylinder rate to a user display, an individual can directly use the detection system as a tool in the establishment of engine condition specific detection threshold factors. The embodiment of the system in FIG. 3 is more generally applicable to a technology implementation where the first and second integrator 109 and 133 produced signals are convened to digital form and the remainder of the system processing is done in a digital mathematics manner. The ratioed first integration to second integration signal 303, the detection threshold factor signal 305 and the knock determination decision signal 147 are input into a gated comparator 129. The gated comparator 129 produces a knock/no-knock indication signal 131, from the result of the comparison of the ratioed first integration to second integration signal 303 and the detection threshold factor signal 305, when the knock determination decision signal 147 is present. The knock/no-knock indication signal 131 may either indicate the results of the last comparison at the time of the receipt of the last knock determination decision signal 147 or may be valid only while the knock determination decision signal 147 is present. The gated comparator 129 basically performs its comparison by a mathematical subtraction of the detection threshold factor signal 305, having a value Sdf, from the ratioed first integration to second integration signal 303. This comparison by mathematical subtraction can be expressed in equation form as:

EQUATION 16

Signal 303–Signal $305 = [(INT(PRO(MN1+CN1+KO1), R1, T1)) / (AVE(INT(PRO(MN2), R2, T2))] - Sdf$ If the sign of this subtraction is positive, the ratioed first integration to second integrated signal 303 is greater than the detection threshold factor signal 305, a knock occurrence indication decision is made. If the sign of this subtraction is negative, the ratioed first integration to second integration signal 303 is less than the detection threshold factor signal 305, a no-knock occurrence indication decision is made.

In the embodiment of the detection system shown in both FIG. 1 and FIG. 2, the resultant knock/no-knock indication signal 131 will be the same in response to the same knock sensor signal 103.

There is nothing in the inherent nature of the embodiment of the detection system in FIG. 1 or FIG. 2 that would preclude the conversion of the detection system from a single knock sensor to multi-knock sensor system. The only design implementation detail that needs to be accounted for in a multi-knock sensor system is that, if a knock sensor select switch is included in the signal processing section 105, before the active bandpass filter, sufficient filter settling time needs to be allowed for between the time when the switch position is changed and an integration operation is started. In conclusion, this system more reliably and accurately detects engine knocking over the full range of engine operating conditions because the error associated with the knock sensor gain is accounted for by the approach described here.

What is claimed is:

1. A method of knock detection comprising the steps of:

measuring engine position and providing a crankshaft position signal indicating a first angular window corresponding to a knock region and a second angular window corresponding to a no-knock region;

measuring engine speed;

measuring engine load;

determining a threshold detection factor dependent on the measured engine speed and measured engine load;

integrating a knock sensor signal over a first period corresponding to the knock region of the crankshaft position signal and providing a first integrated knock sensor signal dependent thereon;

providing a scaled first integrated knock sensor signal dependent on scaling the first integrated knock sensor signal by the threshold detection factor;

integrating the knock sensor signal over a second period corresponding to the no-knock region of the crankshaft position signal and providing a second integrated knock sensor signal dependent thereon;

averaging the second integrated knock sensor signal and providing an averaged second integrated knock sensor signal dependent thereon; and providing a knock indication when an amplitude of the scaled first integrated knock sensor signal exceeds an amplitude of the averaged second integrated knock sensor signal.

* * * * *